United States Patent [19]

Davidson

[11] 4,303,268

[45] Dec. 1, 1981

[54] METHOD AND APPARATUS FOR REMOVING EMBEDDED TICKS

[76] Inventor: Harvey D. Davidson, P.O. Box 103, Orinda, Calif. 94563

[21] Appl. No.: 152,363

[22] Filed: May 22, 1980

[51] Int. Cl.$^{3}$ .................................................. B65G 7/12

[52] U.S. Cl. ........................................ 294/16; 128/354

[58] Field of Search ...................... 294/16, 99 R, 99 S, 294/100; 128/354; 81/43; D28/55

[56] References Cited

U.S. PATENT DOCUMENTS 223,444 1/1880 Gifford ................................ 128/354
266,007 10/1882 Badgor .............................. 294/99 R
660,489 10/1900 Conn .................................. 128/352
4,020,846 5/1977 Stokes ................................ 128/354

*Primary Examiner*—James B. Marbert

[57] ABSTRACT

Improved apparatus is disclosed for removing embedded ticks. The apparatus includes a pair of locking tongs which are especially designed for grasping an embedded tick at the skin line. Thereafter, the grasped tick is removed by means of a rotary or twisting movement. The disclosure is also concerned with a novel method whereby embedded ticks may be removed safely and intact. The method preferably employs the disclosed apparatus.

11 Claims, 11 Drawing Figures

METHOD AND APPARATUS FOR REMOVING EMBEDDED TICKS

THE BACKGROUND OF THE INVENTION

1. The Field of the Invention

The present invention broadly relates to improved apparatus for removing embedded ticks. In one of its more specific embodiments, the invention is concerned with a pair of locking tongs which are especially useful for grasping the exposed body of an embedded tick and thereafter manipulating the same as described more fully hereinafter. The invention further relates to a novel method of removing embedded ticks which preferably employs the apparatus of the invention.

2. The Prior Art

As is well known, ticks are parasitic members of a group of relatively large blood sucking insects of the order ACARI, and of the families IXODIDAE, ARGASIDAE and HIPPOBOSCIDAE. They are wingless and have a barbed proboscis which extends from the head. The proboscis is inserted into the skin of a warm blooded host for the purpose of extracting blood therefrom, which is stored in the tick's large sac-like abdomen. Ticks are further characterized by a sharply defined line of division between the head and thorax-abdomen, and thus the head of an embedded tick is relatively easy to separate from the thorax and abdomen when longitudinal stress is applied thereto.

The proboscis is provided with highly effective inverted V-shaped barbs which are also inserted into the host's skin. These barbs allow the tick to embed its head into the skin surface, and to hold on tenaciously thereto while extracting blood through the proboscis. In fact, an embedded tick holds on so tenaciously that if an attempt is made to remove the tick by grasping the exposed abdomen and pulling outward, the thorax and abdomen portions separate from the head and leave the head in the skin. The embedded head that remains in the skin is often the source of infections. It is therefore apparent that embedded ticks must be removed intact to avoid the possibility of serious infections.

A number of methods have been proposed heretofore for removing embedded ticks intact. However, they each have disadvantages and thus are not entirely satisfactory as presently practiced. Examples of the prior art methods include applying a hot object, such as a freshly extinguished match to the tick's abdomen thereby causing it to release. Other prior art methods include applying irritating or dangerous chemicals and other substances which cause the embedded tick to release. In all of these instances, it is not possible to safely remove the embedded tick intact as there is danger of irritating, burning or permanently damaging the skin at the site. There is also the possibility of harming the host inadvertently as often dogs, cats and other small animals struggle violently when embedded ticks are removed with hot objects or chemicals.

THE SUMMARY OF THE INVENTION

The present invention overcomes the aforementioned and other disadvantages and deficiencies of the prior art. This is accomplished by providing the novel method and improved apparatus for removing embedded ticks from the skin of a warm blooded host which will be described more fully hereinafter.

In one presently preferred embodiment, the apparatus of the invention includes a pair of cooperating longitudinally extending arms arranged in a generally side-by-side relationship. The pair of arms have first and second end portions which include first and second terminal ends, respectively. The arms are joined together on the terminal ends of their second end portions, and are progressively biased away from each other as they extend toward the terminal ends of their first end portions. Thus, their first end portions and the terminal ends thereof are normally spaced apart. The normally spaced paddle-shaped first end portions are resilient whereby upon applying force thereto by squeezing, the terminal ends thereof are moved together. The terminal ends return to their normally spaced relationship when the force is no longer applied. The terminal ends of the first end portions of the pair of arms include a pair of cooperating pressure applying members which are normally spaced apart a distance sufficient to receive the exposed body of an embedded tick. The body of the tick may be inserted therebetween and securely grasped by squeezing the first end portions of the pair of arms to thereby force the pair of pressure applying paddle-shaped members together into a cooperating pressure applying relationship.

An elongated locking sleeve is mounted on the first end portions of the pair of arms. The locking sleeve is mounted whereby the said first end portions of the pair of arms extend through the opening therein, and the pressure applying members are positioned outward from the said opening. A first terminal end portion of the locking sleeve is adjacent the pressure applying members, and the second terminal end portion thereof is remote therefrom. The locking sleeve is slidably mounted on the first end portions of the pair of arms whereby it is movable longitudinally therealong between first and second positions. A first stop means defines the limit of movement of the locking sleeve toward the pair of pressure applying members. The first stop means includes cooperating stop means carried by the first terminal end portion of the locking sleeve and the terminal ends of the first end portions of the pair of arms. The locking sleeve is rotatable on the first end portions of the pair of arms when it is in the first position. A second stop means defines the limit of movement of the locking sleeve toward the terminal ends of the second end portions of the pair of arms. The second stop means includes cooperating stop means carried by the second terminal end portion of the locking sleeve and the first end portions of the pair of arms. The second stop means also includes means for varying the distance between the pair of pressure applying members. The pressure applying members are normally spaced apart a maximum initial distance when the locking sleeve is in the first position. They are moved progressively closer together as the locking sleeve is moved toward the second position, and they are fully closed when the locking sleeve is fully in the second position. The second stop means also includes means effective to retain the pair of pressure applying members spaced apart at a desired distance varying from the maximum initial distance to the fully closed position. The maximum initial distance may be varied by rotating the locking sleeve while it is in the said first position whereby exposed bodies of embedded ticks of smaller and larger sizes may be positioned between the pressure applying members and grasped therebetween upon sliding the locking sleeve toward the said second position.

In practicing one presently preferred variant of the method of the invention, the exposed body of an embedded tick is securely grasped between a pair of pressure applying paddle-shaped members, and then it is subjected to rotary movement until the tick releases its hold on the host. This is done without pulling the exposed body of the tick away from the skin surface while it is being subjected to the rotary movement. After the tick has been thus caused to lose its hold on the host, it is removed intact by pulling outward thereon while the exposed body of the tick is still securely grasped between the pair of pressure applying members.

Reference may be had to the following detailed description of the invention and the accompanying illustrative drawings for a more thorough and complete understanding of the invention.

THE BRIEF DESCRIPTION OF THE ACCOMPANYING DRAWINGS

The invention will be described hereinafter in greater particularity with reference to the presently preferred embodiments thereof illustrated in the accompanying drawings, wherein.

Figure 1:
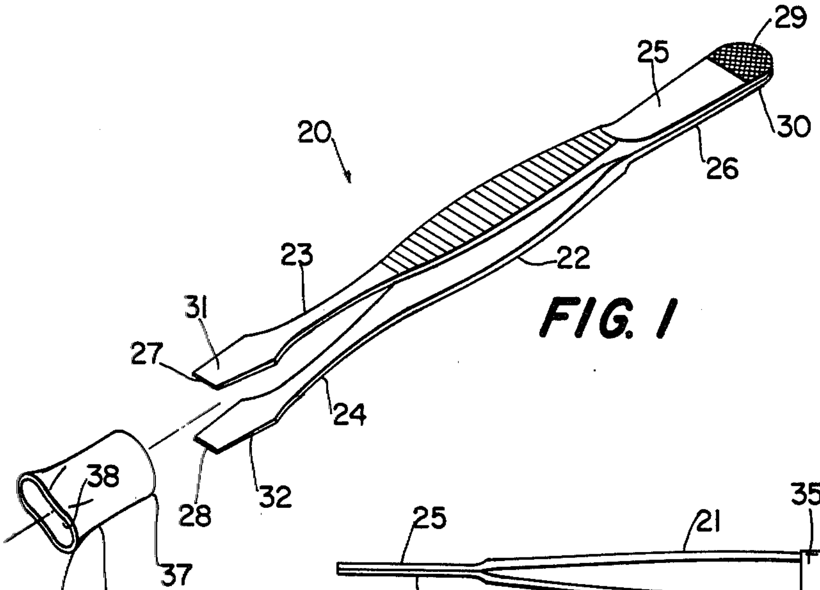
FIG. 1 is an exploded perspective view of the apparatus of the invention for removing embedded ticks.

The aforementioned figures of the drawing are referred to and discussed hereinafter in greater detail.

THE DETAILED DESCRIPTION OF THE INVENTION INCLUDING THE PRESENTLY PREFERRED VARIANTS AND EMBODIMENTS THEREOF

The accompanying drawings illustrate one presently preferred embodiment of the invention which is especially useful for removing embedded ticks from the skin of a warm blooded host. The locking tongs generally designated as 20 include a pair of cooperating longitudinally extending arms 21 and 22 which are arranged in a generally side-by-side relationship. The pair of arms 21 and 22 have first end portions 23 and 24 which include terminal ends 27 and 28, and second end portions 25 and 26 which include terminal ends 29 and 30, respectively. The pair of arms 21 and 22 are permanently joined together on their terminal ends 29 and 30, such as by spot welding, and they are progressively biased away from each other as they extend toward the terminal ends 27 and 28. Thus, the first end portions 23 and 24 and the terminal ends 27 and 28 thereof are normally spaced apart. The normally spaced first end portions 23 and 24 are resilient, and upon applying force thereto such as by squeezing, the terminal ends 27 and 28 are moved together and remain together so long as the force is applied. However, when the force is no longer applied, the terminal ends 27 and 28 return to their initial normally spaced relationship due to the resiliency of the first end portions 23 and 24. The terminals ends 27 and 28 include a pair of cooperating pressure applying members 31 and 32 which are substantially flat and have generally paddle-shaped configurations. The pressure applying members 31 and 32 are normally spaced apart a distance sufficient to receive the exposed body 43 of embedded tick 41 whereby it may be inserted therebetween and securely grasped thereby upon squeezing or otherwise forcing together the first end portions 23 and 24. The pair of pressure applying members 31 and 32 are likewise forced together into a cooperating pressure applying relationship.

An elongated locking sleeve 35 is mounted on the first end portions 23 and 24. The locking sleeve 35 has an opening 38 extending longitudinally therethrough, and first and second terminal end portions 36 and 37, respectively. The locking sleeve 35 is mounted whereby the first end portions 23 and 24 extend through the opening 38, and the pressure applying members 31 and 32 are positioned outward from the terminal end 36. Thus, the terminal end portion 36 is adjacent the pressure applying members 31 and 32, and the second terminal end portion 37 is remote therefrom.

Figure 2:
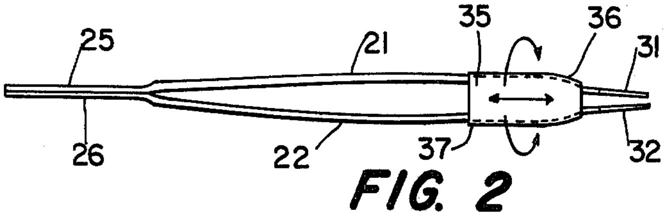
FIG. 2 is a side view in elevation of the assembled apparatus of the invention, with the locking sleeve being in the unlocked position initially assumed upon assembly of the exploded components of the apparatus of FIG. 1.
Figure 3:
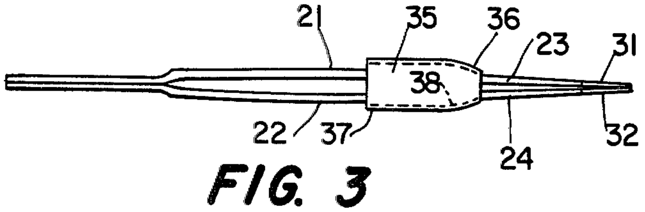
FIG. 3 is a view similar to FIG. 2, but with the locking sleeve being moved to the locking position.
Figure 4:
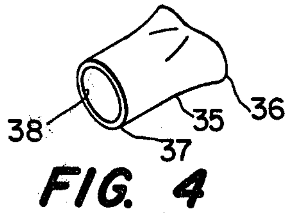
FIG. 4 is a perspective view of the locking sleeve of FIG. 1, further illustrating the configuration of the opening and adjacent sleeve wall in the opposite end thereof.
Figure 5:
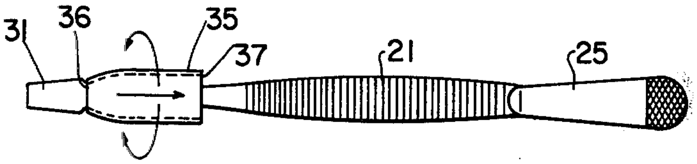
FIG. 5 is a top view of the assembled apparatus of the invention, with the locking sleeve being rotated 90° from the unlocked position initially assumed upon assembly of the exploded components of the apparatus of FIG. 1.
Figure 6:
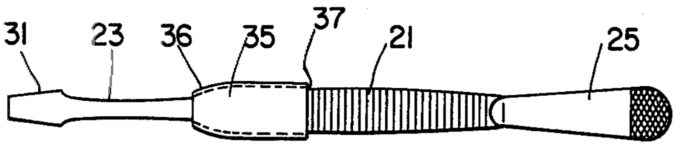
FIG. 6 is a view similar to FIG. 5, but with the locking sleeve being moved to the locking position.
Figure 7:
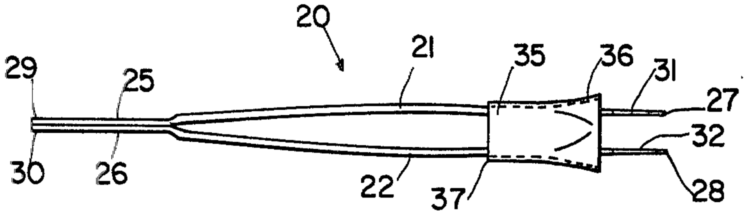
FIG. 7 is a side view in elevation of the assembled apparatus of FIG. 5.
Figure 8:
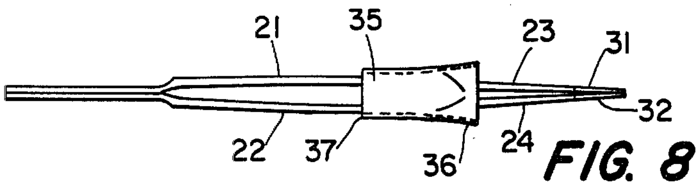
FIG. 8 is a side view in elevation of the assembled apparatus of FIG. 6.

The locking sleeve 35 is slidably mounted on the first end portions 23 and 24, and it is movable longitudinally therealong between the first positions illustrated in FIGS. 2, 5 and 7, and the second positions illustrated in FIGS. 3, 6 and 8. The first terminal end portion 36 of the locking sleeve 35 has a generally oval cross-sectional configuration, and the second terminal end portion 37 has a generally circular cross-sectional configuration. The locking sleeve 35 is rotatable when in the position illustrated in FIGS. 2, 5 and 7, but it is not rotatable when in the position of FIGS. 3, 6 and 8. The opening 38 is of a size and configuration to receive the terminal ends 27 and 28, including the pressure applying members 31 and 32 which are substantially enlarged, when sleeve 35 is in the first rotary position shown in FIG. 2. The locking sleeve 35 is removable from the first end portions 23 and 24 when it is rotated to the first rotary position illustrated in FIG. 2, but it is not removable when rotated to the second position of FIG. 5 due to the width of the pressure applying members 31 and 32 being greater than the minimum cross-sectional width of the oval terminal end portion 36.

Figure 9:
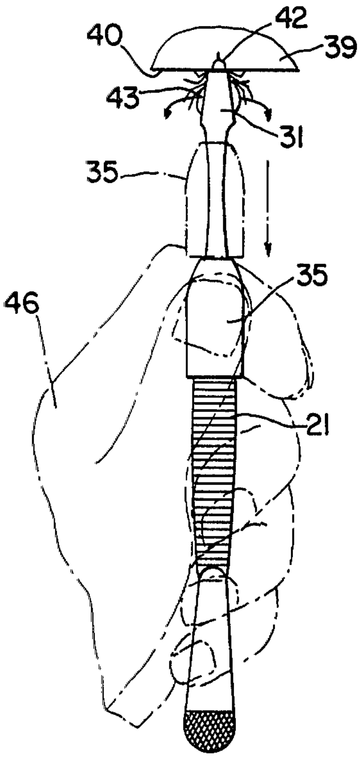
FIG. 9 is a top view of the assembled apparatus of FIG. 1, partially in phantom line, illustrating the use thereof in grasping the exposed body of an embedded tick and rotating the same to thereby cause the tick to release its hold on the host.
Figure 10:
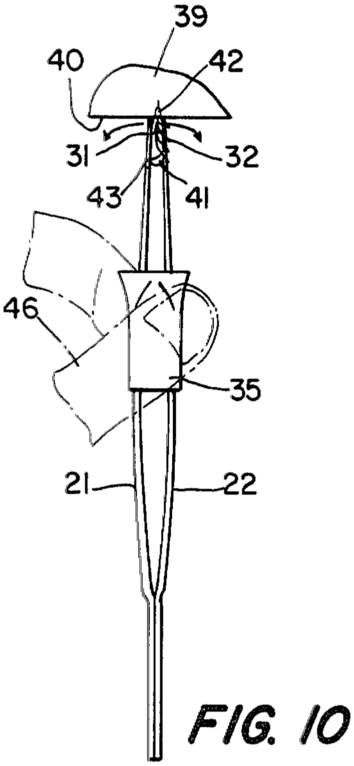
FIG. 10 is a side view in elevation of FIG. 9.
Figure 11:
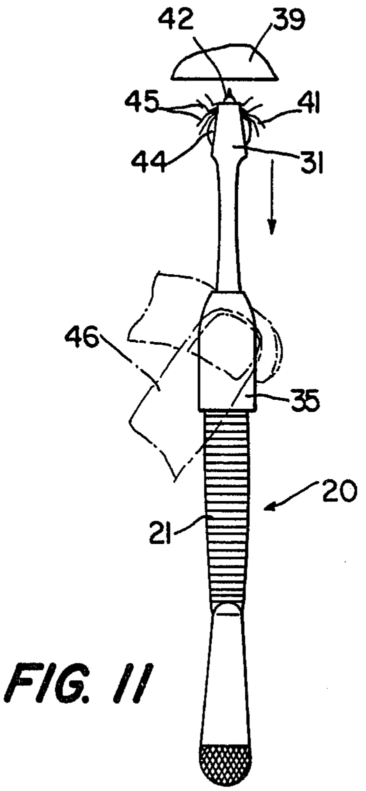
FIG. 11 is a view similar to FIG. 9, further illustrating the removal of the embedded tick of FIGS. 9 and 10 after the tick has been caused to release its hold on the host.

FIGS. 9, 10, and 11 illustrate the use of the locking tongs 20 in the method of the invention for removing an embedded tick 41 from the skin 39 of a warm blooded host. As may be seen in FIGS. 9 and 10, the head 42 of tick 41 is embedded beneath the skin surface 40, and the exposed body of the tick 41, including the abdomen-thorax 44 and the legs 45, extends outward from the skin surface 40. With reference to FIG. 9, the locking sleeve 35 of tongs 20 is initially in the position illustrated in FIGS. 5 and 7, as is shown in phantom line, and thus the pressure applying members 31 and 32 are spaced apart the maximum initial distance which is best seen in FIG. 7. The embedded tick 41 is positioned between the pressure applying members 31 and 32, and is then securely grasped thereby upon sliding the locking sleeve 35 from the position illustrated in phantom line to the position illustrated in solid line in FIG. 9.

Upon sliding locking sleeve 35 from the first position illustrated in phantom line to the second position illustrated in solid line in FIG. 9, and as is further illustrated in FIGS. 6 and 8, the pressure applying members 31 and 32 are caused to move progressively closer together. This is due to the first end portions 23 and 24 being squeezed together by the cam-like action of the opening 38 as it slides over the outer surfaces of first end portions 23 and 24. When the locking sleeve 35 is in the second or fully closed position illustrated in solid line, then the pressure applying members 31 and 32 are in their fully closed positions and thus the exposed body 43 of tick 41 is securely grasped between the pressure applying members 31 and 32. Thereafter, the exposed body 43 is subjected to rotary movement generally around its longitudinal axis by means of hand 46 until the tick is caused to release its hold on the host. This usually requires at least one, and often at least two, complete revolutions around the generally longitudinal axis of the tick. More than one or two revolutions may be made when necessary or desired. As a rule of thumb, about 1–4 complete revolutions are adequate for causing the tick to release its hold, but more or less revolutions may be made provided the intended purpose is accomplished, i.e., the tick is caused to release its hold.

As is best seen in FIGS. 9 and 10, the pressure applying members 31 and 32 are of a size and shape to securely grasp the exposed body 43 from the skin line 40 outward, and to apply sufficient pressure thereto to immobilize the exposed body 43 during the rotation thereof, and also during the removal thereof. The rotary movement may be clockwise or counterclockwise. While the tick is being rotated, the exposed body 43 should be firmly grasped between the pressure applying members 31 and 32 without pulling outward from the skin surface 39. This will avoid any possibility of separation of the head 42 from the exposed body 43. After the embedded tick 41 has been caused to lose its hold on the host, it is then removed intact by pulling outward thereon from the skin surface 39, as is illustrated in FIG. 11 of the drawings. It may be noted that the exposed body 43 is still securely grasped between the pressure applying members 31 and 32 as the embedded tick 41 is being removed.

Reference may be had to the text *Small Animal Dermatology,* 2nd Edition, W. B. Saunders Company (Philadelphia), which is incorporated herein by reference, for a more detailed and complete disclosure of parasitic ticks which may be removed by the method and apparatus of the present invention. Pages 324–328 are especially pertinent, and a number of illustrations appear therein. It is understood that the longitudinal axis of the tick is taken longitudinally through the proboscis and continues therefrom to the opposite end of the tick, whereby the tick is divided into two equal halves. It is also understood that the tick is preferably rotated around its longitudinal axis, as distinguished from its transverse axis, to thereby cause it to release its hold on the host.

The above discussion of the method of the invention was with respect to the locking sleeve 35 being rotated to the position illustrated in FIGS. 5–8 of the drawings, wherein the pressure applying members 31 and 32 are initially spaced a maximum distance apart as illustrated in FIG. 7. This is usually the preferred rotary position for the sleeve 35 and especially in instances where large ticks are being removed. However, it is also possible to use the tongs 20 with the sleeve 35 rotated to the position illustrated in FIGS. 2 and 3. When the sleeves 35 is in this position, the pressure applying members 31 and 32 are initially spaced much closer together, and it is not possible to grasp as large an object. When the object to be grasped is small enough to be inserted between the pressure applying members 31 and 32, then it is often convenient to use the tongs 20 with the locking sleeve 35 rotated to the position of FIGS. 2 and 3. Thus, the rotation of sleeve 35 to the position illustrated in FIGS. 2 and 3, or to the position illustrated in FIGS. 5–8. has the effect of varying the maximum initial spacing of pressure applying members 31 and 32, and allows an initial spacing to be selected which corresponds to the size of the object to be grasped. The manner of operating the locking tongs 20 when using the locking sleeve 35 in the position illustrated in FIGS. 2 and 3 is the same as that discussed above in connection with FIGS. 5 through 8.

It is also possible to remove the locking sleeve 35 by rotating it to the position illustrated in FIG. 2 and then pulling outward thereon to the position illustrated in FIG. 1. The resultant tongs are useful as tweezers. This is a further advantage of the present invention as the locking tongs 20 may be used as tweezers.

With reference to FIGS. 9–11, it is apparent that only one hand is required for operating the locking tongs 20. The remaining hand is free for other purposes, such as holding a dog, cat, or other small animal during the removal of embedded ticks therefrom. This is a further important advantage of the present invention as often small animals struggle while ticks are being removed therefrom. There is always a possibility of inadvertently causing injury to the animal when practicing prior art methods or when using prior art apparatus which requires two hands. This is avoided in practicing the present invention.

The foregoing detailed description and the accompanying drawings are for purposes of illustration only, and are not intended as being limiting to the spirit or scope of the appended claims.

I claim:

1. Locking tongs which are especially useful for removing embedded ticks from the skin of a warm blooded host comprising a pair of cooperating longitudinally extending arms arranged in a generally side-by-side relationship, the said pair of arms having first and second end portions which include first and second terminal ends respectively, the said pair of arms being joined together on the said terminal ends of their second end portions and being progressively biased away from each other as they extend toward the said terminal ends of their first end portions whereby their said first end portions and the terminal ends thereof are normally spaced apart, the normally spaced said first end portions of the pair of arms being resilient whereby upon applying force thereto by squeezing the terminal ends thereof are moved together and whereby the said terminal ends are returned to their normally spaced relationship when the said force is no longer applied, the said terminal ends of the first end portions of the pair of arms including a pair of cooperating pressure applying members which are normally spaced apart a distance sufficient to receive the exposed body of an embedded tick whereby the exposed body of an embedded tick may be inserted therebetween and securely grasped by squeezing the said first end portions of the pair of arms to thereby force the said pair of pressure applying members together into a cooperating pressure applying relationship, an elongated locking sleeve having an opening extending longitudinally therethrough and first and second terminal end portions, the locking sleeve being mounted on the said first end portions of the pair of arms, the locking sleeve being mounted whereby the said first end portions of the pair of arms extend through the said opening and the said pressure applying members are positioned outward from the said opening, the said first terminal end portion of the locking sleeve being adjacent the said pressure applying members and the said second terminal end portion of the locking sleeve being remote therefrom, the locking sleeve being slidably mounted on the said first end portions of the pair of arms whereby it is movable longitudinally therealong between first and second positions, first stop means defining the limit of movement of the locking sleeve toward the said pair of pressure applying members, the said first stop means including cooperating stop means carried by the said first terminal end portion of the locking sleeve and the said terminal ends of the first end portions of the pair of arms, the locking sleeve being rotatable on the said first end portions of the pair of arms when in the said first position, second stop means defining the limit of movement of the locking sleeve toward the said terminal ends of the second end portions of the pair of arms, the said second stop means including cooperating stop means carried by the said second terminal end portion of the locking sleeve and the first end portions of the pair of arms, the said second stop means also including means for varying the distance between the said pair of pressure applying members, the said pair of pressure applying members being normally spaced apart a maximum initial distance when the locking device is in the said first position and being moved progressively closer together as the locking sleeve is moved toward the said second position and being fully closed when the locking sleeve is fully in the said second position, the said second stop means also including means effective to retain the said pair of pressure applying members spaced apart at a desired distance varying from the maximum initial distance to the fully closed position, the said first terminal end portion of the locking sleeve having an oval cross-sectional configuration and the said second terminal end portion of the locking sleeve having a circular cross-sectional configuration, and the said maximum initial distance being variable by rotation of the locking sleeve while in the said first position whereby exposed bodies of embedded ticks of smaller and larger sizes may be positioned between the said pressure applying members and grasped therebetween upon sliding the locking sleeve toward the said second position.

2. The apparatus of claim 1 wherein the said pair of cooperating pressure applying members are substantially flat and have generally paddle-shaped configurations.

3. The apparatus of claim 1 wherein the said opening in the locking sleeve is of a size and configuration to receive the terminal ends of the first end portions of the pair of arms including the said pressure applying members, the said first stop means is rendered inoperative when the locking sleeve is rotated to a first rotary position and is rendered operative when the locking sleeve is rotated to a second rotary position, the locking sleeve is removable from the said first end portions of the pair of arms when it is rotated to the said first rotary position and is incapable of being removed from the said first end portions of the pair of arms when it is rotated to the said second rotary position, and the resultant pair of tongs after removal of the locking sleeve is useful as a pair of tweezers.

4. The apparatus of claim 3 wherein the said pair of cooperating pressure applying members are substantially flat and have generally paddle-shaped configurations.

5. The apparatus of claim 4 wherein the said cooperating pressure applying members carry a portion of the said first stop means.

6. A method of removing an embedded tick from the skin of a warm blooded host comprising the steps of securely grasping the exposed body of the embedded tick between a pair of pressure applying members, thereafter subjecting the exposed body of the embedded tick to rotary movement until the tick releases its hold on the host, the exposed body of the embedded tick being grasped by the said pair of pressure applying members without pulling it outward from the skin surface while the tick is being subjected to the said rotary movement, and then after the embedded tick has been thus caused to lose its hold on the host removing the embedded tick intact by pulling outward thereon from the skin surface while the body of the tick is still securely grasped by the said pair of pressure applying members.

7. The method of claim 6 wherein the said embedded tick is removed with the apparatus of claim 1.

8. The method of claim 6 wherein the exposed body of the tick is rotated generally around its longitudinal axis until it is caused to release its hold on the host.

9. The method of claim 6 wherein the exposed body of the tick is rotated generally around its longitudinal axis from about 1 to 4 revolutions to thereby cause the tick to release its hold on the host, and the said pressure applying members are of a size and shape and sufficient pressure is applied thereto whereby the exposed body of the embedded tick is securely grasped therebetween during the said rotation thereof.

10. The method of claim 6 wherein the exposed body of the tick is rotated generally around its longitudinal axis until it is caused to release its hold on the host, the exposed body of the tick being rotated from about 1 to 4 revolutions, the said pressure applying members are of a size and shape and sufficient pressure is applied thereto whereby the exposed body of the embedded tick is securely grasped therebetween during the said rotation thereof, and the exposed body of the embedded tick is immobilized between the said pair of pressure applying members from the skin line outward while the tick is subjected to the said rotary movement and also while it is being removed by pulling outward from the skin surface.

11. The method of claim 10 wherein the said embedded tick is removed with the apparatus of claim 5.

* * * * *